US005546455A

United States Patent [19]

Joyce et al.

[11] Patent Number: 5,546,455
[45] Date of Patent: Aug. 13, 1996

[54] METHOD FOR ACCESSING REAL-TIME DATA IN AN AUTOMATIC CALL DISTRIBUTION SYSTEM

[75] Inventors: Robert Joyce, San Jose; Jeffrey Rosler, Milpitas; Jason Ehrlich, Fremont; Jean-Luc Brouillet, Palo Alto, all of Calif.

[73] Assignee: Aspect Telecommunications, San Jose, Calif.

[21] Appl. No.: 364,063

[22] Filed: Dec. 27, 1994

Related U.S. Application Data

[63] Continuation of Ser. No. 110,902, Aug. 24, 1993, abandoned.

[51] Int. Cl.$^6$ .................................................. H04M 3/22
[52] U.S. Cl. ...................... 379/265; 379/266; 379/279; 379/112
[58] Field of Search ............................ 379/265, 266, 379/201, 112, 34, 136, 134, 121, 122, 139, 279

[56] References Cited

U.S. PATENT DOCUMENTS

| | | | |
|---|---|---|---|
| 4,150,428 | 4/1979 | Inrig et al. ........................... | 379/279 |
| 5,101,425 | 3/1992 | Darland et al. . | |
| 5,153,909 | 10/1992 | Beckle et al. ........................... | 379/265 |

*Primary Examiner*—Jeffery Hofsass
*Assistant Examiner*—Scott Wolinsky
*Attorney, Agent, or Firm*—Townsend and Townsend and Crew

[57] ABSTRACT

In an automatic call distribution (ACD) system having a plurality of client systems and at least one host server system, the host server system for conducting transactions in real time, a method is provided for creating and reporting data substantially synchronously with other data and in substantial real-time with events which generate the data wherein at the host server system requests are handled and translated directly into executable machine code containing all knowledge needed to execute the request as a query as if the query were directed to a relational database, a query in real-time interaction is used to access data in shared memory of the host server system and report information, typically status information related to transactions of interest, to the requesting client system. Method and apparatus are provided for mapping between the logical view of shared memory and the physical structure of shared memory wherein in the form of a data access module which provides a function to execute for each field in the logical view of shared memory. These functions can return a value from shared memory or can return a value based on calculations on data in shared memory. A database manager module is employed to monitor data in a static database and to provide relevant information to shared memory for access by the data access module, so that the data access module need not access the static database directly.

18 Claims, 6 Drawing Sheets

Microfiche Appendix Included
(479 Microfiche, 12 Pages)

METHOD FOR ACCESSING REAL-TIME DATA IN AN AUTOMATIC CALL DISTRIBUTION SYSTEM

This is a Continuation of application Ser. No. 08/110,902 filed Aug. 24, 1993, now abandoned.

COPYRIGHT NOTICE

A portion of the disclosure of this patent document contains material which is subject to copyright protection. The copyright owners have no objection to the facsimile reproduction, by anyone, of the patent document or the patent disclosure, as it appears in the patent and trademark office patent file or records, but otherwise reserve all copyright rights whatsoever.

MICROFICHE APPENDIX

The Appendixes, comprising a total of 479 frames of microfiche, including a cover page, is included as part of this application. It represents an embodiment of the method of the present invention. The source code in the Appendixes represent unpublished work, Copyright ©1992, 1993 by Aspect Telecommunications Corporation. All rights reserved. Copyright protection claimed includes all forms and matters of copyrightable material and information now allowed by statutory or judicial law or hereafter granted, including without limitation, materials generated from the software programs which are displayed on the screen such as icons, screen display looks, etc.

BACKGROUND OF THE INVENTION

This invention relates to real-time information access and more particularly to methods for accessing telephone-call-related information in an automatic call distribution (ACD) system wherein dynamic real-time information is queried in real time without having been stored previously in a static or mass storage data structure. This invention relates more particularly to elements of such systems for optimally routing incoming calls. Automatic call distributors provide automatic routing of incoming telephone calls in conjunction with a private switchboard or Private Branch Exchange (PBX) equipment through caller responses to prompts. An ACD is frequently used by relatively large companies to screen calls as part of telephone-based support for services to remote users or for routing requests regarding products or services for sale.

A significant requirement of an ACD system is a need for continuous and substantially real-time system operation and availability of access to data. In the ACD system of interest, to minimize the adverse impact of failure of key hardware, the system configuration includes extensive redundancy.

In the past, known ACD systems have not had the ability to flexibly query real-time data from shared memory. Flexible query mechanisms are those which enable end users to define at the user interface level what specific data should be retrieved. Flexible querying has generally been limited to interaction with historic data from static databases which have been stored on mass storage devices. Access to real-time data in shared memory has in the past been limited to fixed query presentations provided by the manufacturer. Thus, in past real-time data collection systems used in ACDs, real-time data, which is of immediate and important interest and which is constantly in flux, was not accessible through flexible query mechanisms. Part of the problem is the conventional requirement for transfer of large amounts of data to and from mass storage devices and the delays associated with those transfers.

In some prior ACD systems, end-user requests directed at so-called real-time data have generally required retrieval of entire files of data, although only a small subset of a large set of data might be needed to satisfy the end-user requests. However, the request and query procedures of other known ACD systems have conventionally required retrieval of large sets of data before relevant information could be examined and/or displayed. An example in a dedicated outbound dialing system is found in U.S. Pat. No. 5,101,425, issued Mar. 31, 1992, wherein a client system gets data from a host, processes the data at the client and selects a subset of data at the client to display. Other representative ACD systems are provided by AT&T (integrated into a PBX) and Rockwell International (a standalone ACD system).

In addition, in some prior ACD systems, additional delays were introduced in transferring data representative of status information from a central database server (a host server at a call center) to remote reporting stations (multiple client systems at a local site or remote sites) in order to minimize adverse impact on the performance of the central database server due to limitations in both processor load handling capacity and in data transfer rate (bandwidth) capacity of communication links between sites. What is needed is a data creation and data query technique in an ACD system in which the integrity of the data as displayed is maintained continuously, and in substantially real time without adversely impacting performance of the underlying background processes.

SUMMARY OF THE INVENTION

According to the invention, in an automatic call distribution (ACD) system having a plurality of client systems and at least one host server system, the host server system being for conducting transactions in real time, a method is provided for creating and flexibly reporting data substantially synchronously with other data and in substantial real-time with events which generate the data wherein a first module is provided at the host server system which accepts and processes requests and in real time translates the requests directly into executable machine code containing all knowledge needed to execute the request as a query as if the query were directed to a relational database, and a second module which uses the query in real-time interaction to access data in shared memory of the host server system and report information, typically status information related to transactions of interest, to the requesting client system. Sets and subsets of data are typically reported on the client system all together or synchronously in response to queries from multiple clients in substantially real time. Queries from the client side may be specified to be generated at a preselected update interval, which may vary based on user needs, so that some data subsets may be updated only infrequently. Method and means are provided to return a value from shared memory or return a value based on calculations on data in shared memory. A database manager module is employed to monitor data in a static database and to provide relevant information to shared memory for access by the data access module, so that the data access module need not access the static database directly.

The invention will be better understood upon reference to the following detailed description in connection with the accompanying drawings.

DESCRIPTION OF SPECIFIC EMBODIMENTS

Figure 1:
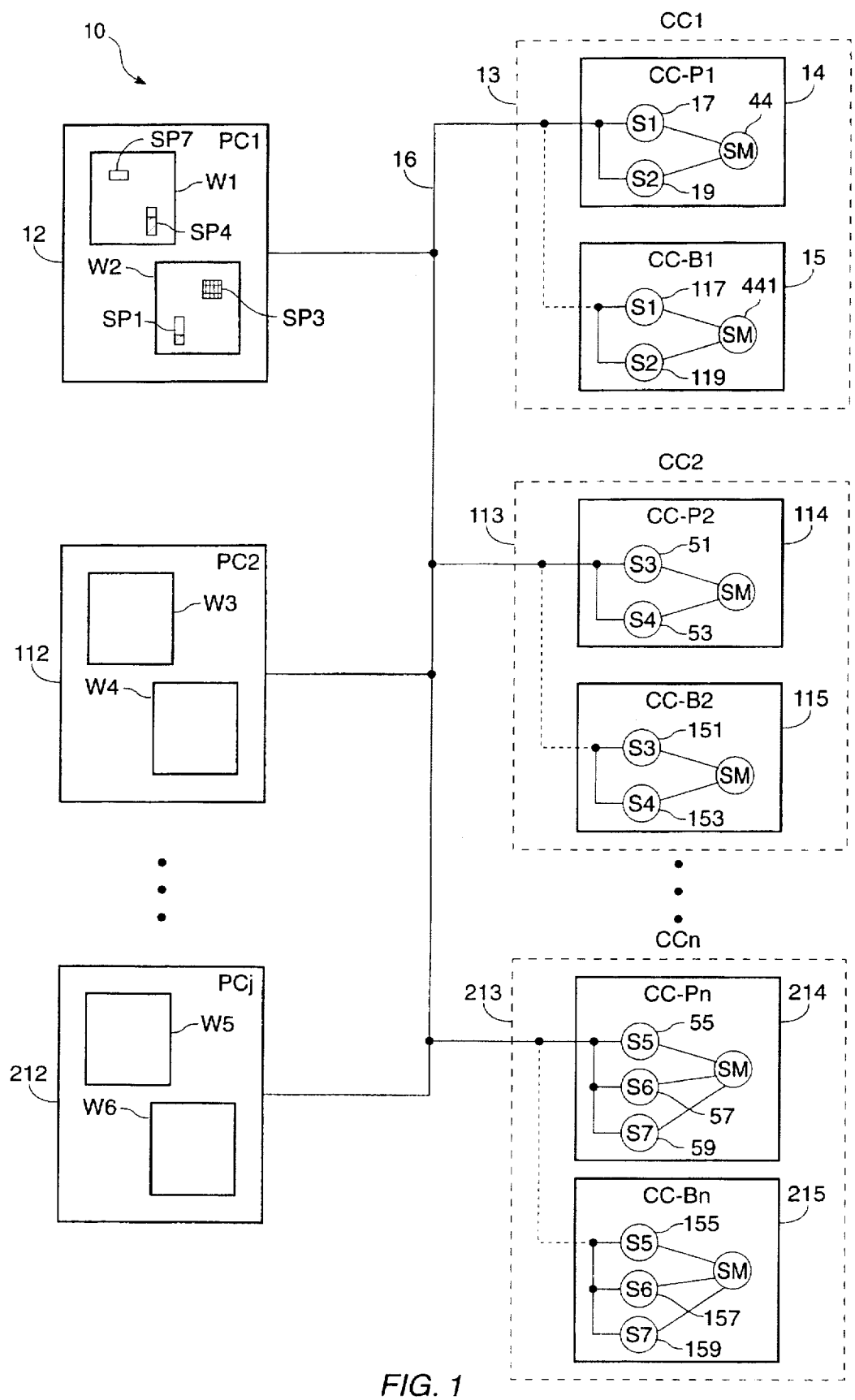
FIG. 1 is a block diagram of an environment showing a plurality of hosts systems and a plurality of client systems.

Referring to FIG. 1, ACD system 10 comprises client computer systems 12, 112, 212, such as personal computers numbered PC1, PC2, . . . PCj, and host servers 13, 113, 213, labeled Call Centers, namely, CC1, CC2, . . . CCn, all connected together via a network 16. Within each of the host systems 13, 113, 213 are a primary control center processor (CC-P1, CC-P2, CC-PN) 14, 114, 214 and a redundant control center processor (CC-B1, CC-B2, CC-BN) 15, 115, 215. The functions of the client computer system are fully redundant. Specifically, the function of each primary control center processor is duplicated by its paired redundant control center processor. The first primary control center processor 14 in host system 13 has a shared memory (SM) 44 which is accessible by a plurality of sessions 17, 19 (51, 52) whose functions are matched cycle for cycle in a duplicate shared memory 441 as duplicate sessions 117 and 119 in the first redundant control center processor 15. Similarly, primary control processors 114 and 214 have shared memories accessible by sessions 51, 53 (S3, S4) and 55, 57, 59 (S5, S6, S7) whose functions are matched cycle for cycle in duplicate shared memories as duplicate sessions 151, 153 and 155, 157, 159, respectively. The redundant control center processors 15, 115 and 215 do not assume any operational role unless a corresponding primary control center processor 14, 114 and/or 214 is inoperative. The host servers 13, 113, 213 are thus considered by the client computer systems as single processor systems, each of which is conducting sessions associated with a window on the respective client computer systems.

Within the local operation and display environment of the respective client systems 12, 112, 212, there are a plurality of windows W1, W2, W3, W4, W5, W6, and within the windows there may be one or more active session processes. For example, in window W1, there may be session processes of different call centers, such as SP7, relating to the session S7 (59) on third primary control center processor 214; and SP4, relating to the session S4 (153) on second redundant control center processor 115. Similarly, in window W2, there may be session processes such as SP1, relating to the session S1 (17) on first primary control center processor 14; and session process SP3, relating to the session S3 (151) on second redundant control center processor 115. Other windows W3, W4, W5, W6 on local client systems may carry other session processes. In accordance with the invention, therefore, a single client system (more conventionally known as a PC or a workstation) can interact simultaneously with a plurality of host servers in querying and obtaining reports based on a mixture of real-time data and historic data by access to shared memory, the format of which can be defined and modified with flexibility at the client system.

Figure 2:
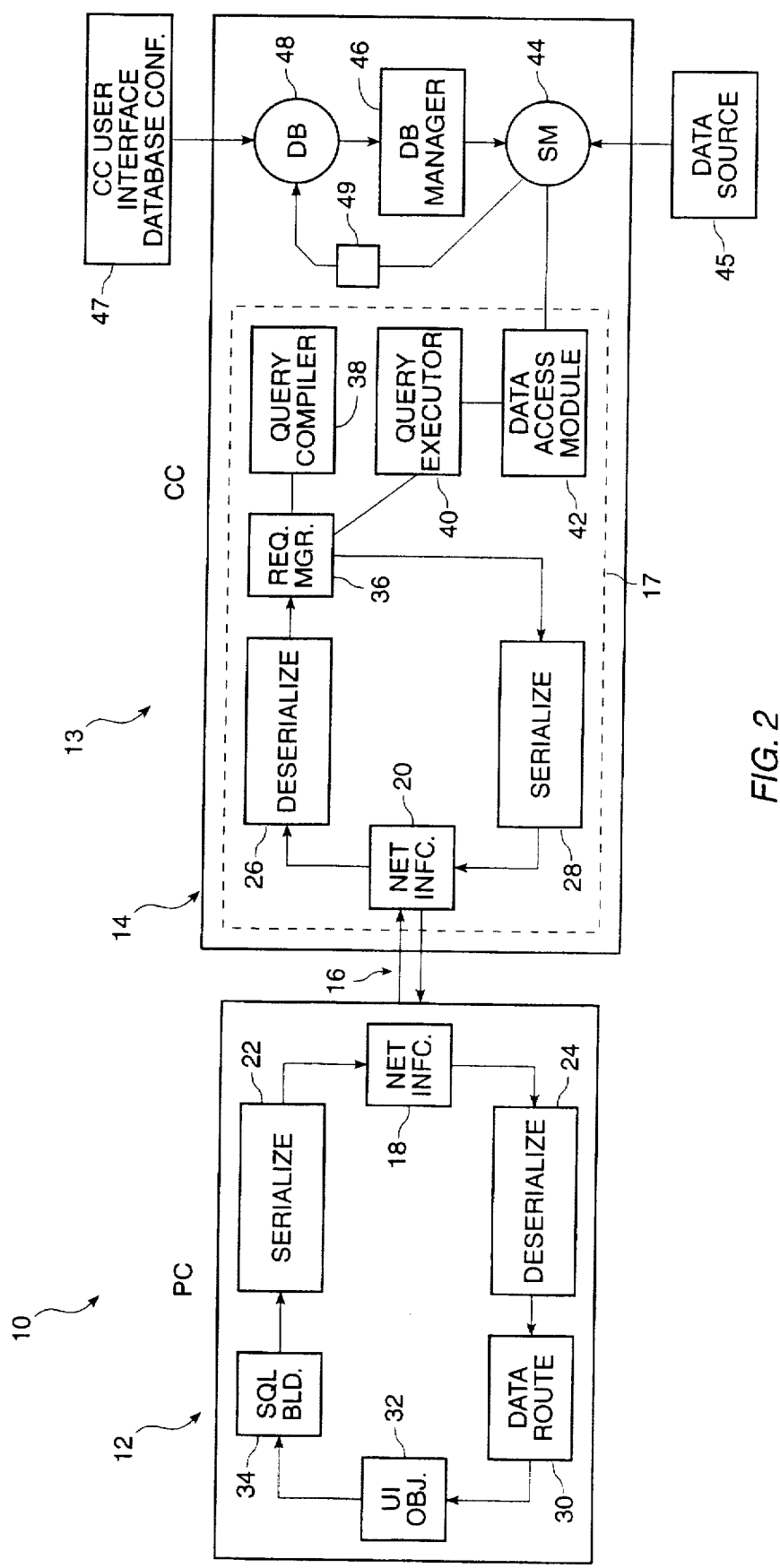
FIG. 2 is a block diagram showing an exemplary client system and host server in accordance with the invention.

Each session and session process with associated shared memory may be viewed as a single system. FIG. 2 illustrates a functionally operative system according to the invention. ACD system 10 includes client system or workstation 12 and call center or host server 13 whose functionality is incorporated in a session 17 running on a control processor such as primary control processor 14 associated with shared memory 44 and which is interconnected through a client network interface 18 and a host network interface 20. (For convenience, the host side is hereinafter referred to as a host server 14). Data over the network 16 is packetized in a serial data stream for convenience of transmission over the network medium. To this end, in the client 12 there is a serial-to-parallel converter 24 for received data and a parallel-to-serial converter 22 for transmitted data, and the network supports the TCP/IP protocol. Similarly in the host server 14 there is a serial-to-parallel converter 26 for received data and a parallel-to-serial converter 28 for transmitted data.

Within the client 12 there are special processor means which are relevant to the present invention. A data router 30 is coupled to receive input from the serial-to-parallel converter 24 and to format and process it to be provided as input to a user interface (UI) object processor 32, which in turn provides an object-oriented, user-interactive interface. The UI object processor 32 interacts with a user in an object-oriented setting based on data received from the data router 30, and, in response to user input or automatic processes, supplies high-level output as input to an SQL builder 34. In this case, the user is the individual who designs the report display windows for the service agents, management or group supervisors that may view the display window on a similar terminal screen of a local workstation. In a preferred embodiment of the invention, the UI object processor 32 may be built on a base set of object-oriented tools.

The SQL builder 34 uses the SQL query language to field the high-level input and prepare queries based on the SQL language structure. More specifically, the SQL builder 34 examines the objects built by the user, which objects describe and characterize a user request for information, and the builder constructs the SQL query corresponding to the request in a form suitable for querying real-time data. Unlike known SQL builders, which are capable of forming queries suited only for database queries, the SQL builder 34 according to the invention is capable of forming queries suited for retrieving information in real time from shared memory of a host server. In a specific embodiment of the invention, only a subset of the SQL commands need to be implemented, as available and proposed embodiments of the system generally do not require a large SQL vocabulary for specialized tasks. This subset of functionality comprises:

Joins

Aggregates, including min, max, avg, sum and count

Filtering via the equal (=) and the "in" and conjunctions within a "where" clause.

The SQL builder 34 passes messages and SQL queries via the serializing processes and interfaces 18, 16, 20, etc., to the host server 14. For the workstation side, the messages include:

Logon

Add Request

Alter Request

Remove Request

Synch Request

Version Request.

The Add Request comprises a request containing a specification of what data is needed from real-time memory, corresponding to the SQL select statement, the designation of the rows of data to send and the frequency with which the data is to be sent to the client. The Remove Request is its complement. The Alter Request includes changes to the update frequency and the rows requested. It cannot change an SQL query.

Appendix A attached hereto provides a tutorial and outline of a session process in accordance with the invention, including a listing of the parsed SQL structure.

The host can return certain messages, namely,

Version Message

Data Message

Error Message.

The Data Messages are the elements of primary interest herein.

In the host 14, the queries and messages are analyzed and routed by a module known as a request manager 36. The request manager 36 is employed in connection with a module known as a query compiler 38 as hereinafter explained to control a module known as a query executor 40, which in turn interacts with a data access module 42 to retrieve real-time information from shared memory 44 according to the invention. Replies in response to the SQL queries are directed from query executor 40 and data access module 42 through the request manager 36 back to the client 12 so that the user receives a relational database-like view of the real-time data. The elements 20, 26, 28, 36, 38, 40, 42 together form the functionality defining a "session" and specifically the session 17 (FIG. 1). There is one such instance for each session.

Shared memory 44 is accessible to all sessions, and the shared memory receives real-time data from external sources 45. Shared memory 44 is also accessed by and communicates with a database manager 46, which in turn tracks the content of shared memory 44 and registers changes as needed in a database 48. The database 48 is generally updated only at the end of a transaction, so the database 48 contains only historic data. Appendix H contains a listing of source code which describes how the database manager 46 interacts with shared memory 44. The shared memory is in turn accessed by the data access module 42, as hereinafter explained.

All data to be made accessible to the clients 12, 112, 212 is in shared memory 44. According to the invention, shared memory 44 is viewed through tables with fields in the tables containing real-time data, as well as an image of historic data supplied by the database manager 46 from the database 48. In a specific embodiment, the shared memory 44 is organized into fourteen tables of about 200 fields which support integer types, decimal types and string types of data. Selected fields within some tables may be calculated from other fields in shared memory 44. Thus, data can be either in raw or calculated form, the form of which is transparent to external applications. There are several types of current data in shared memory: instantaneous data, such as the number of calls waiting in a queue; averaged data; slow cycle (half-hour) updated data; and cumulative data.

Appendix B contains a description of real-time tables and fields in one embodiment of the invention. Tables and field descriptions are set forth. The tables include an Agent Table, an Agent Group Table, an Agent Group Half-Hour Table, an Agent Line Table, an Agent Summary Table, an Alert Table, an Application Table, an Application Call Queue Table, an Application Half-Hour Table, a System Table, a Team Table, a Trunk Table, a Trunk Group Table, and a Trunk Group Half-Hour Table. Each table contains a number of fields which is for data that is either absolute or calculated. Details are also contained in Appendix B.

Shared memory 44 may communicate to the database 48 through other processes 49 so that the session 17 need only read the shared memory 44 and need not directly query the database 48. A user interface 47 is coupled to the database 48 for the purposes of providing the database configuration information relating to the structure of storage of the data.

The session 17 in a preferred embodiment implemented in computer programs is written in the language C. The session process SP1 operative on the workstation 12 is preferably implemented in an object-oriented environment in a language such as the computer language C++. The specific implementation of a session and a session process will be better understood by reference to the following description.

Figure 3:
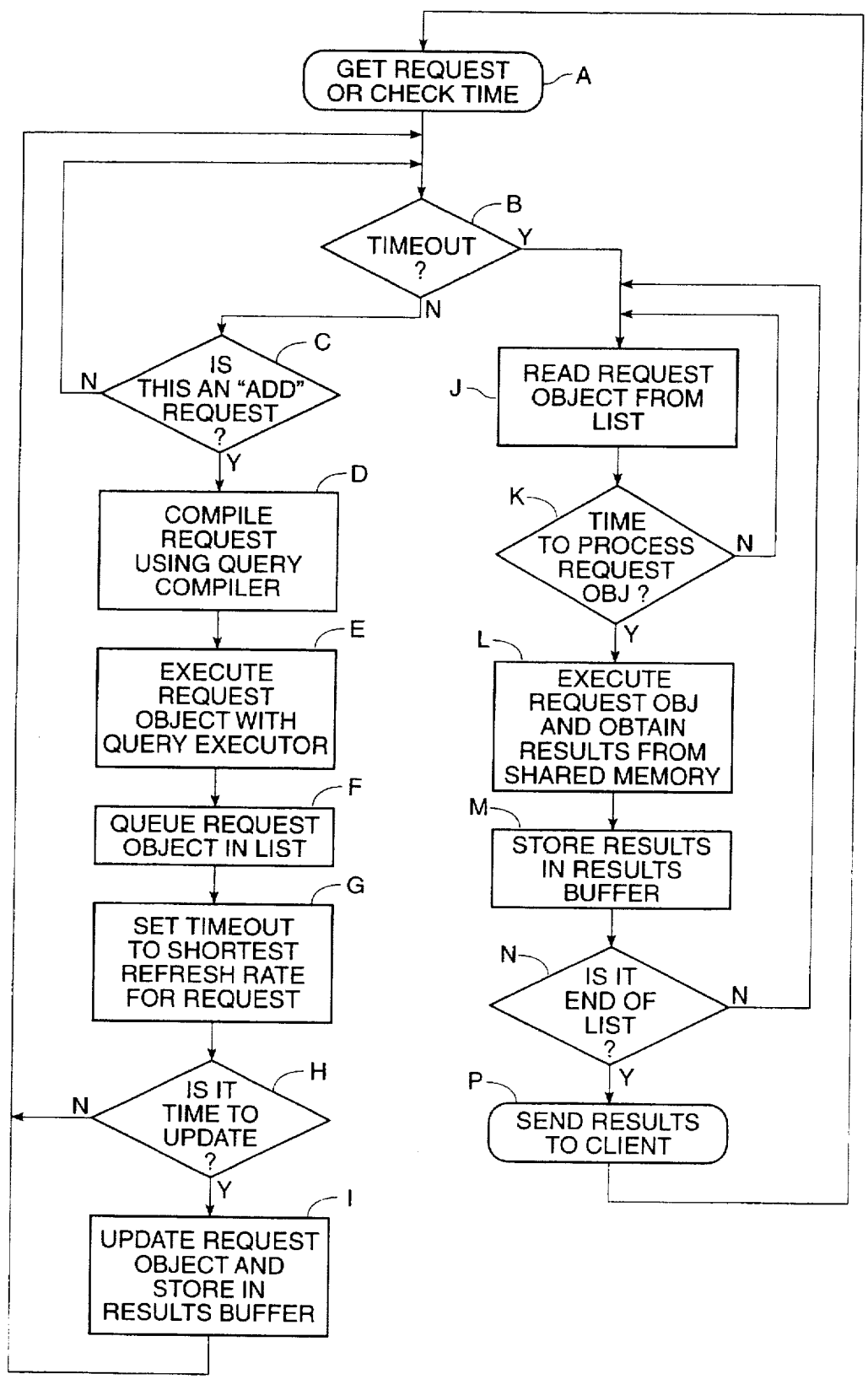
FIG. 3 is a flowchart of a request manager module according to the invention.

FIG. 3 is a flowchart of a request manager 36 module according to the invention. The request manager 36 operates in connection with a timing element (not shown) either to process requests or to report results at intervals predetermined by a timeout. The request manager 36 checks the time or gets a request (e.g., responds to an interrupt) (Step A). It then tests for a timeout (Step B). If there was no timeout, it then tests for an "Add"-type request (Step C). If not, it recycles to check for a timeout (Step B), continuing in the mode until either a timeout occurs or an Add request is received. If an Add request has occurred, the request is then immediately converted to machine readable form, i.e., compiled, through the query compiler 38, as hereinafter explained into a request object (Step D). The request object is then executed using the query executor 40 (the computer system's operating system) to obtain results (Step E). The request object is then queued into an object list with other request objects (Step F). Thereupon the request manager 36 checks and if needed adjusts (shortens) the timeout related to the refresh rate used to invoke the report functions to the various clients (Step G). The timeout is set to the shortest refresh rate for any of the queued request objects. The timeout is then again checked, and if that timeout has occurred (Step H), the request manager 36 updates the current request object with the latest data and stores that data in a results buffer so it can be supplied to the clients (Step I) and returns to check for request or timeout (Step B); otherwise it simply returns to check for request or timeout (Step B).

Once a timeout does occur, the request manager 36 reads the next request object from the object list (Step J) and checks the time to see if that object is to be processed (executed) (Step K). If not it returns to read the next object in the object list (Step J). When it has read an object which is to be executed, it then executes the request object and obtains results from the tables in shared memory (Step L), and then it stores the results in the results buffer (Step M). It then checks to see if it has reached the end of the object list (Step N), returning to read the next request object if it has not finished (Step J). Otherwise, the request manager 36 sends the results to the client via the serializer 28 (Step P) and returns to the beginning of the real-time cycle (Step A).

Figure 4:
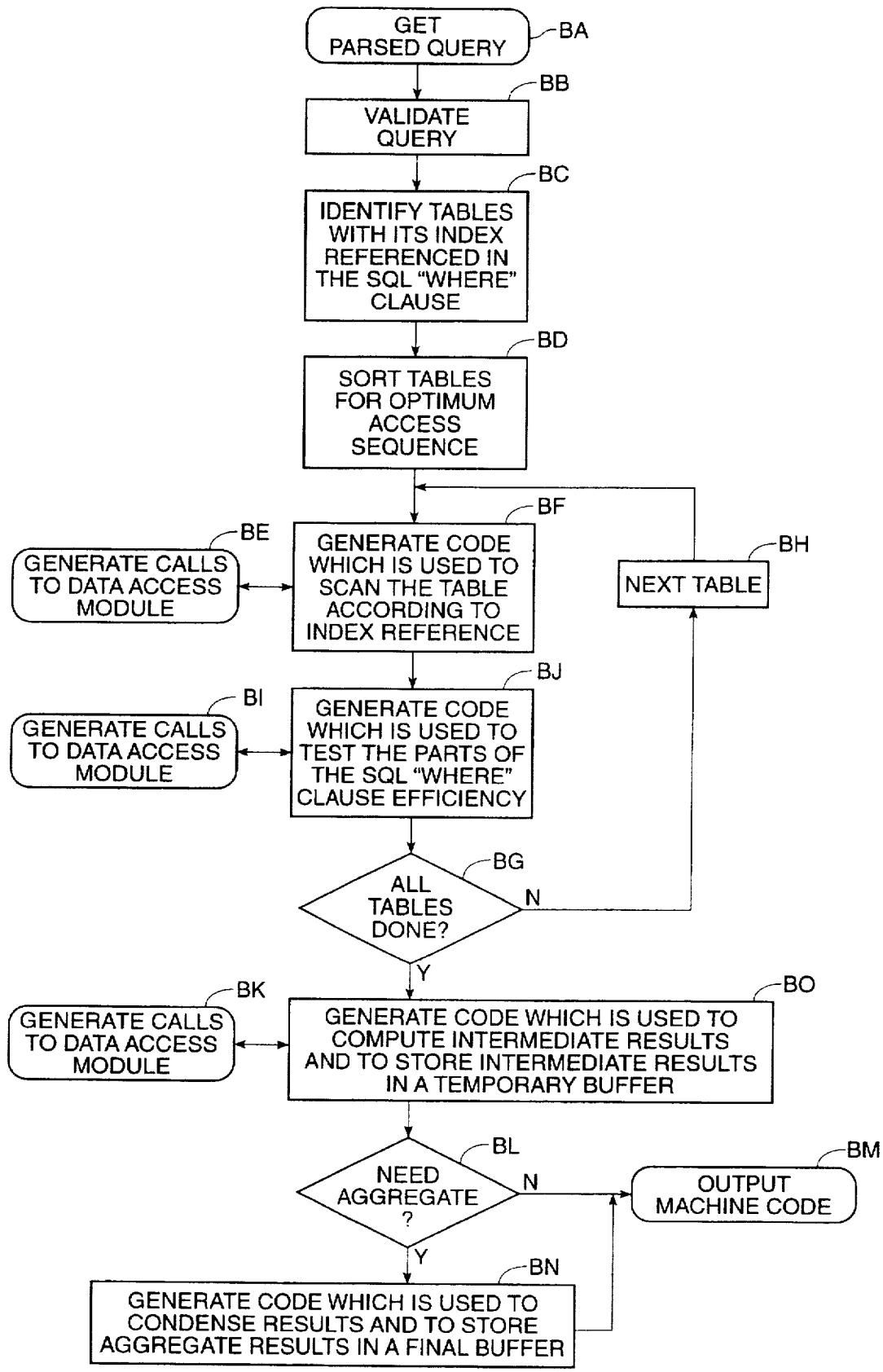
FIG. 4 is a flowchart of a query compiler module according to the invention.

FIG. 4 describes the operation of the query compiler 38 which is controlled by the request manager 36. The query compiler 38 compiles requests in SQL parsed query form into machine code as soon as received, relying on parsed queries provided to it (Step BA), checking first to determine if the query is valid (Step BB). As a first functional step, it identifies which tables have their index referenced in the "where" clause of the SQL query (Step BC), and then the query compiler sorts the tables associated with the parsed query into an optimum sequence for access in order to minimize processing time (Step BD).

Thereupon, the query compiler 38 generates, for each table, the code which is to be used to scan the table in accordance with the previously-established indexed reference (Step BF), including generating code that will call the data access module 42 (Step BE). Thereafter, it generates the code which is to be used to test the parts of the SQL "where" clause, selecting code which optimizes speed (Step BJ), including generating the code for calls to the data access module (Step BI). This process is carried out until all the tables are done (Steps BG, BH). It then generates the code which is to be used to compute any intermediate results or other results which do not require so-called aggregation (reference to cumulative information) (Step BO), again generating the code which is to be used to call the data access module (Step BK), and generating code which is to be used to store the results in a temporary buffer. If no aggregate information is needed from this query (Step BL), the query compiler outputs the machine code for execution (Step BM). Otherwise, it goes on to generate the code which is to be used to condense results in accordance with the request aggregation and which is to be used to store the aggregate results in a final buffer (Step BN). The resultant machine code is output for immediate execution as instructed by the request manager (Step BM).

Referring to FIG. 2, the query executor 40 is preferably an element of a conventional operating system in that it simply responds to and executes the machine executable code prepared by the query compiler as instructed by the request manager 36 and based on functions provided by the data access module 42. The query executor interacts with the shared memory 44 through the data access module 42 and returns the results to buffers as needed by the request manager 36. In accordance with the invention, the machine code prepared by the query compiler 38 can be executed immediately upon command of the request manager 36, which thereby keeps information flow to the clients updated in substantially real time.

Figure 5:
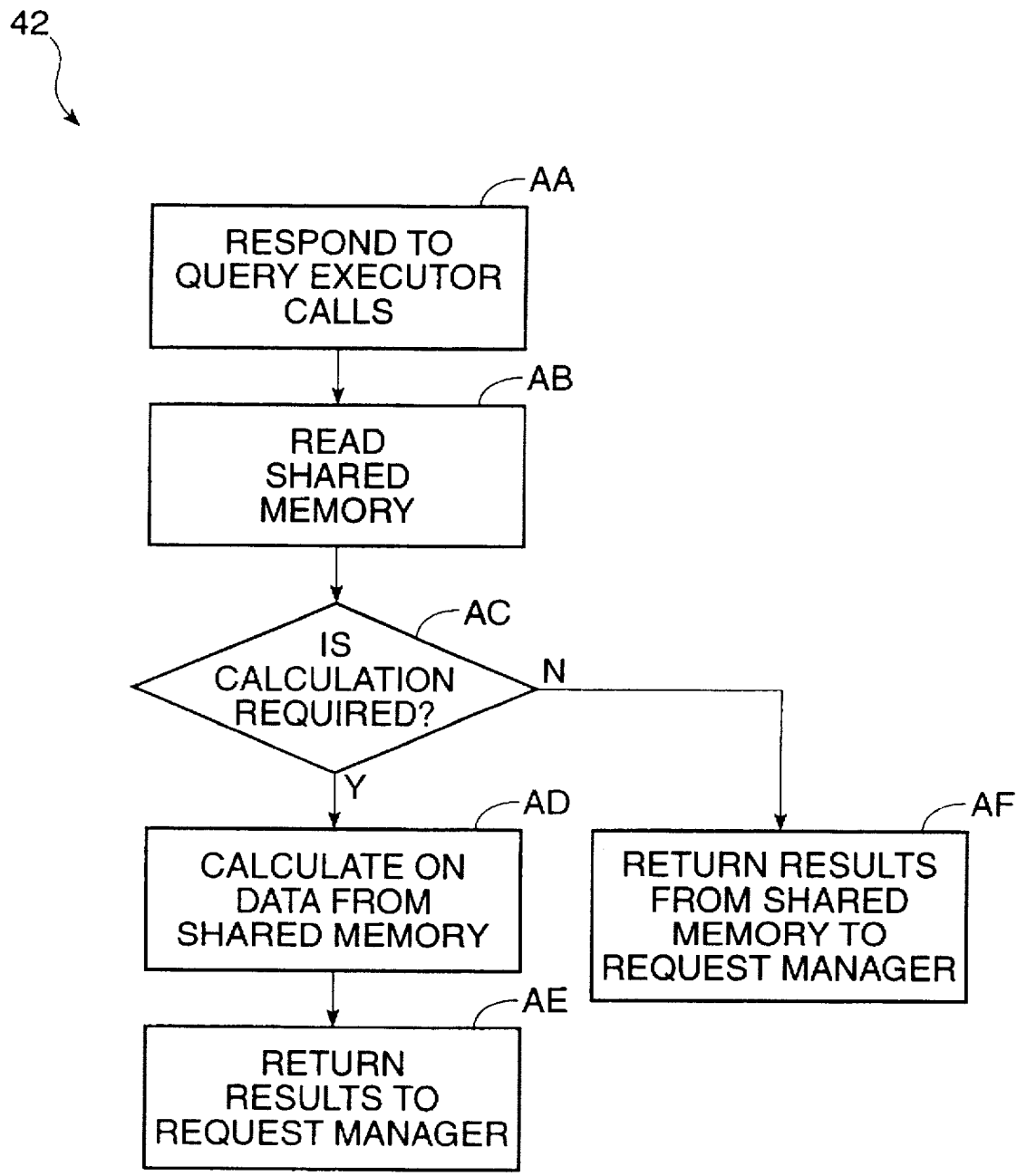
FIG. 5 is a flowchart of a data access module according to the invention.

FIG. 5 is a flow chart of operation of the data access module 42 as it is used to interact with shared memory 44. The data access module 42 is in one view a collection of function calls which are used in reads of shared memory 44. The query compiler 38 calls upon the data access module 42, via the query executor 40 to access shared memory 44.

In operation, and referring to FIG. 5, the data access module 42 responds to the query executor 40 calls to access the referenced locations in shared memory 44 (Step AA). Then it reads the shared memory 44 in accordance with the code as translated into machine code (Step AB). If a calculation on the information in the fields is required (Step AC), the code of the data access module calculates the values for the field (Step AD) and returns the results (from temporary buffers) to the request manager 36 (Step AE). If no calculation is required (Step AE), the value in the accessed field is returned directly from shared memory 44 to the request manager 36 (Step AF).

One example of the data access module 42 is set forth in Appendix E, in connection with Appendixes C through G. Appendix C is an overview of a session manager, including elements of the logical description of the data. Appendix D contains datafeed code, including part of query compiler 38 (build.c, parse.c). Appendix E is the data access module. Appendix F contains the datatype definitions, including definition of structures of the query compiler (build.h, parse.h). Appendix G contains miscellaneous elements.

At the host side, results are reported by the request manager 36, as previously described. It updates its report of information at fixed intervals simultaneously as defined by the designer of the display (the user). By synchronizing the updating of results on the display, distractions of display changes are minimized.

Figure 6:
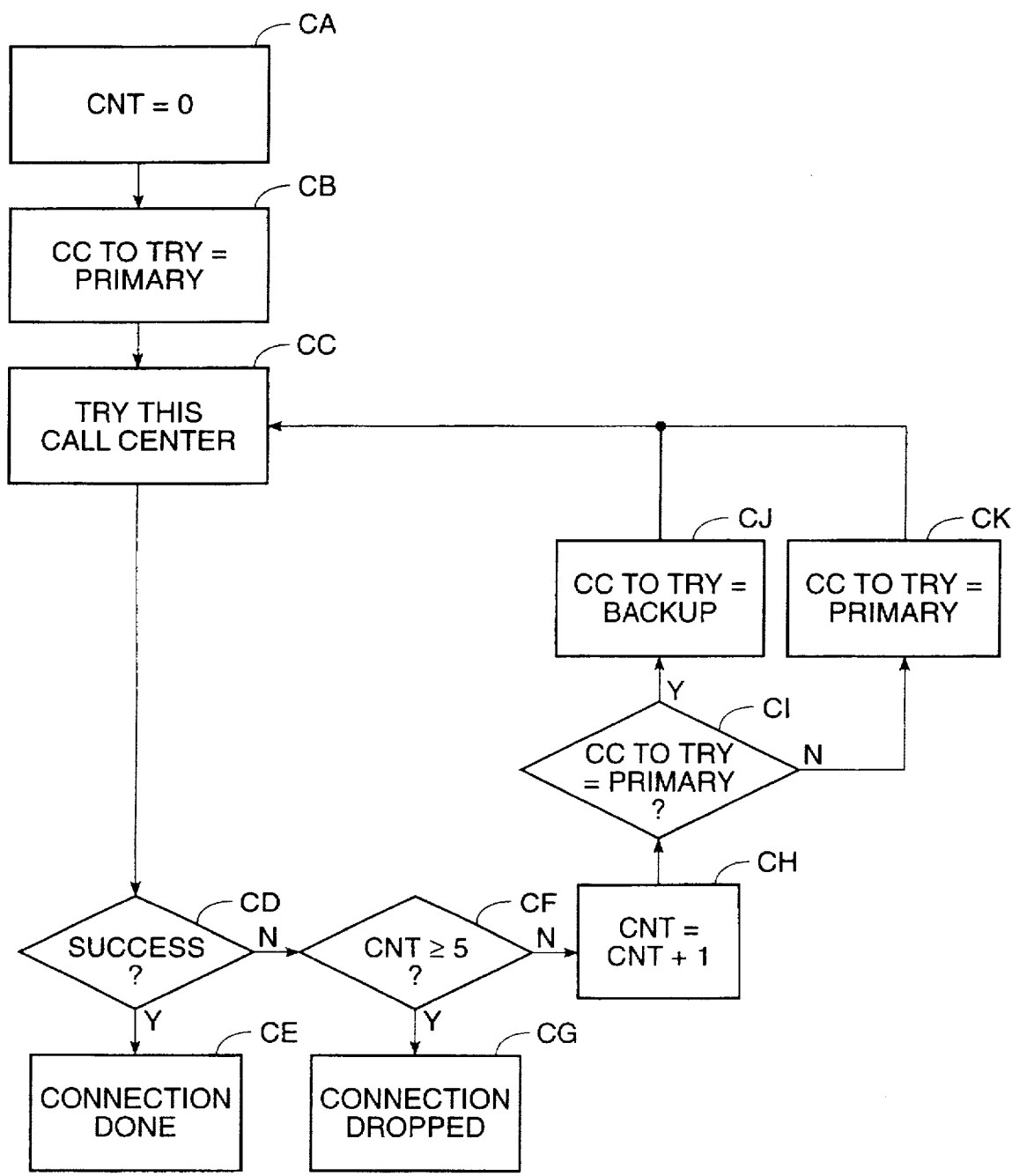
FIG. 6 is a flowchart of a "cut to backup" control for a real-time redundant computer system according to the invention.

As part of the operation of a host server 13 with primary and redundant processors, there must be a mechanism for testing operation and transferring control from a defective primary control center processor (CC-P1) 14 and its associated redundant control center processor (CC-B1) 15. In operation, and referring to FIG. 6, the "Cut to Backup" or transfer to redundant control processor operation employs a set of tests. In a control process for the client 12, a "Try" counter is initialized to Zero (Step CA) and a Try Choice Selector is set to "Primary" (Step CB) so that the client 12 will default to select the primary control processor 14. The client 12 attempts to connect to a designated host 13 (call center) with the default setting (Step CC), and if successful (Step CD) completes the connection (Step CE). If not successful, the client 12 tests to see if the try counter has overflowed its countup limit, e.g., five try cycles (Step CF); if yes, the attempted connection is dropped on grounds that the designated host is not operating properly (Step CG). If the countup is not exceeded, then the try counter is incremented (Step CH) and the Try Choice Selector is tested (Step CI). If set to primary, the Try Choice Selector is changed to Backup (redundant) (Step CJ) and the attempted connection process is repeated for the backup (Step CC). If the Try Choice Selector is set to Backup (Step CI), then it is changed to primary (Step CK) and the attempted connection process is repeated again for the primary (Step CC). The process proceeds until either a connection is made or no connection can be established after the preselected number of retries. By integrating into the client the option of connecting directly to the alternative processors, the invention allows operation without loss of data or degradation of operation.

The invention has now been explained with reference to specific embodiments. Other embodiments will be apparent to those of ordinary skill in this art. It is therefore not intended that this invention be limited, except as indicated by the appended claims.

What is claimed is:

1. In an automatic call distribution (ACD) system having a plurality of client systems and at least one host server system having shared memory, the host server system for conducting transactions in real time, a method for analyzing and reporting on live data in substantial real time comprising the steps of:

generating, at any one of the client systems, a query for a user-specified subset of said live data, said query comprising data elements from shared memory or any combination of, aggregation of or value derived from a calculation based on said data elements;

processing at the host server system said query for said user-specified subset of live data;

identifying, at the host server system, the data to be collected and analyzed to respond to the query;

automatically generating, at the host server system, executable machine code from the query, said executable machine code containing all knowledge needed to execute immediately the user request as a query as if the query were directed to a relational database;

storing the machine code thereafter for execution;

executing the machine code as a request object; and thereafter as a consequence of execution of the machine code, immediately accessing said live data in said shared memory to report results to the requesting client system based upon said user-specified subset of data stored in said shared memory.

2. The method according to claim 1 further including the step of using each one of said client systems to issue a plurality of queries to at least one said host server system in order to elicit results from shared memory.

3. The method according to claim 1 wherein the host server system includes a primary control processor and a redundant control processor wherein the redundant control processor duplicates operation of the primary control processor synchronously, further including the step of using the client systems to test for connection to the primary control processor and to select connection to the redundant control processor upon failure to obtain a connection with the primary control processor.

4. The method according to claim 1 wherein the client systems alternately test for connection to the primary control processor and the redundant control processor for a predetermined number of times indicative that a connection cannot be established to the host system.

5. The method according to claim 1 further including the step of using a query compiler to accept parsed SQL queries from the requesting client, to identify tables having its index referenced in a "where" clause of the SQL query, and to generate code which can be used to scan said tables by index reference.

6. The method according to claim 5 wherein the query compiler is used to generate code which can retrieve results from shared memory.

7. The method according to claim 6 wherein the query compiler is used to generate code which can be used to condense results from shared memory into aggregate results.

8. The method according to claim 1 wherein the processing step includes processing a plurality of queries and using a request manager in the host server system to set a timing sequence that establishes when each of said plurality of queries is executed.

9. The method according to claim 8 further including the step of providing tabular views of data in shared memory even when the data is in non-tabular form.

10. The method according to claim 8 wherein the executing step comprises using data access module means to access shared memory in substantially real-time and to return both raw results from shared memory and calculated information based on data in shared memory to said request manager.

11. The method according to claim 8 wherein the request manager is used to initiate the compiling of a query into a request object, to initiate execution of a compiled request object, and to queue compiled request objects in a list.

12. The method according to claim 11 wherein the request manager is used to set a refresh rate for said request object so that said query may be repeatedly executed.

13. The method according to claim 12 wherein the request manager is used to initiate updates of request objects after initial execution and before reporting results to the requesting client.

14. The method according to claim 13 wherein the request manager is used to report results to the requesting client only upon occurrence of a timeout.

15. In an automatic call distribution (ACD) system having a plurality of client systems and at least one host server system having shared memory storing data readable with a plurality of function calls, the host server system for conducting transactions in real time, a method for flexibly analyzing the data stored in the shared memory in substantial real time, said method comprising the steps of:

generating, at one of said client systems, a user-specified query which requests a user-defined subset of the data stored in shared memory by allowing a user to select with an object-oriented user interface data elements to be analyzed and reported on and automatically building said user-specified query from said selected data elements, said user-specified query comprising data elements from shared memory or any combination of, aggregation of or value derived from a calculation based on said data elements;

transmitting said user-specified query to said host system;

processing said user-specified query, at said host system, in substantial real-time to identify the data to be collected and analyzed to respond to said user-specified query and to generate executable machine code containing all information needed to execute the user-specified query as a query as if the query were directed to a relational database;

storing said generated machine code thereafter;

setting a refresh rate for said stored machine code so that said query can be repeatedly executed; and repeatedly executing said stored machine code as a request object at said refresh rate to (i) immediately access said user-defined subset of data in said shared memory as determined by a subset of said plurality of function calls corresponding to said user-specified query and (ii) report results of the executed request object to the client system creating said user-specified query each time said stored machine code is executed.

16. An automatic call distribution (ACD) system comprising:

(a) a computer network;

(b) a plurality of client systems coupled to said computer network, each of said plurality of client systems comprising:

(i) user-interface means for providing an object-oriented user-interface allowing a user to identify user-specified live data to be reported to at least one of said plurality of client systems and analyzed, said user-interface means supplying a high-level output representing said user-specified data;

(ii) a query builder, coupled to said user-interface means, to prepare queries from said high-level output to retrieve said selected data, said query comprising data elements from shared memory or any combination of, aggregation of or value derived from a calculation based on said data element;

(iii) a network interface, coupled to said query builder and to said computer network, to transmit said queries from said plurality of client systems over said computer network; and (c) a host server system for executing at least first and second sessions having access to a shared memory which receives real time data from external sources, said shared memory comprising a plurality of tables and said first and second sessions each comprising:

(i) a network interface, coupled to said computer network, to receive queries from said plurality of client systems;

(ii) a query processor to identify the data to be collected and analyzed to respond to the queries and to compile said queries into executable machine code in substantial real time;

(iii) a query executer to execute said compiled queries as request objects immediately accessing said shared memory to retrieve said selected data from said shared memory; and (iv) a request manager, coupled to said network interface, said query compiler and said query executer, to route received queries to said query compiler for compiling and to control operation of said query executer.

17. The ACD system set forth in claim 16 wherein said query processor checks to determine if a received query is valid, identifies which of said plurality of tables have an index referenced in said query, sorts said indexed tables associated with said query into an optimum sequence for access in order to minimize processing time, and generates said executable machine code for immediate execution of said query.

18. The ACD system set forth in claim 17 wherein data in said shared memory comprises instantaneous data, averaged data, slow cycle data and cumulative data.

* * * * *